US011174881B2

(12) United States Patent
Kobayashi et al.

(10) Patent No.: US 11,174,881 B2
(45) Date of Patent: Nov. 16, 2021

(54) PRESSURE RESISTANT DEVICE AND FLUID PRESSURE CYLINDER

(71) Applicant: KYB Corporation, Tokyo (JP)

(72) Inventors: Toshio Kobayashi, Gifu (JP); Kazuhiko Matsumoto, Gifu (JP); Norifumi Imai, Gifu (JP); Takahiro Hikasa, Aichi (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/642,746

(22) PCT Filed: Sep. 27, 2018

(86) PCT No.: PCT/JP2018/036085
§ 371 (c)(1),
(2) Date: Feb. 27, 2020

(87) PCT Pub. No.: WO2019/069797
PCT Pub. Date: Apr. 11, 2019

(65) Prior Publication Data
US 2021/0079937 A1    Mar. 18, 2021

(30) Foreign Application Priority Data
Oct. 5, 2017 (JP) .............................. JP2017-194856

(51) Int. Cl.
*F15B 15/14* (2006.01)
*B23K 26/282* (2014.01)
*F16J 12/00* (2006.01)

(52) U.S. Cl.
CPC ........ *F15B 15/1438* (2013.01); *B23K 26/282* (2015.10); *F16J 12/00* (2013.01)

(58) Field of Classification Search
CPC ....................................................... F16J 12/00
See application file for complete search history.

(56) References Cited

U.S. PATENT DOCUMENTS

| 3,559,540 A * | 2/1971 | Sheldon .............. F15B 15/1433 92/163 |
| 4,324,171 A * | 4/1982 | Gaylord .............. F15B 15/1438 29/888.04 |
| 5,651,303 A * | 7/1997 | Fish .................... F15B 15/1438 29/453 |
| 7,036,624 B2 * | 5/2006 | Maruyama ............... B62D 5/22 180/417 |
| 8,807,016 B2 * | 8/2014 | Beumer .............. F15B 15/1438 92/169.1 |
| 9,989,075 B2 * | 6/2018 | Bueter ................ F15B 15/1438 |
| 10,167,855 B2 * | 1/2019 | Tamashima ........... F01B 3/0085 |

(Continued)

FOREIGN PATENT DOCUMENTS

| JP | S591493 U | 1/1984 |
| WO | 2014/184291 A2 | 11/2014 |
| WO | 2017/183561 A1 | 10/2017 |

*Primary Examiner* — Michael Leslie
(74) *Attorney, Agent, or Firm* — Rabin & Berdo, P.C.

(57) ABSTRACT

A pressure resistant device includes a tubular main body portion, a lid portion having a wall portion joined to the main body portion, a positioning portion provided to oppose an inner peripheral surfaces of the main body portion and the wall portion, and a groove portion formed on the inner peripheral surface, and the positioning portion is provided to oppose an edge of the groove portion.

8 Claims, 8 Drawing Sheets

(56) References Cited

U.S. PATENT DOCUMENTS

| | | | |
|---|---|---|---|
| 10,184,501 B2 * | 1/2019 | Nomura | F15B 15/1442 |
| 10,697,479 B1 * | 6/2020 | Jackan | B23K 33/006 |
| 2019/0128291 A1 | 5/2019 | Kobayashi et al. | |

* cited by examiner

PRESSURE RESISTANT DEVICE AND FLUID PRESSURE CYLINDER

TECHNICAL FIELD

The present invention relates to a pressure resistant device and a fluid pressure cylinder.

BACKGROUND ART

A pressure resistant device such as a cylinder in a fluid pressure cylinder and a pressure container may be formed by welding a tubular main body portion and a lid portion to each other. For example, a cylinder of a fluid pressure cylinder is formed by welding a cylinder tube and a cylinder bottom to each other. A joining portion that is formed at the time of welding may project on an inner peripheral surface of a cylinder or a container. In this case, stress concentration occurs at a root of a projecting portion, and there is a possibility that a crack occurs in the joining portion from this root. In order to decrease the stress at the root of the projecting portion, there is a proposal to form a groove on the inner peripheral surface of the cylinder or the container (WO2014/184291A2).

SUMMARY OF INVENTION

In the cylinder disclosed in WO2014/184291A2, an extending portion serving as a positioning portion that opposes an inner peripheral surface of a cylinder tube is provided in a cylinder bottom, and relative positions of the cylinder bottom and the cylinder tube are set by the positioning portion. A groove extending in the circumferential direction is formed on the inner peripheral surface of the cylinder tube. By this groove, a route of force to be transmitted from the cylinder tube to the cylinder bottom via a joining portion is narrowed down. As a result, force transmitted to the inner periphery of the joining portion is reduced, and stress at the root of the joining portion is decreased, so that durability of the cylinder is improved.

As the groove of the inner peripheral surface of the cylinder is closer to the joining portion, the force to be transmitted to the inner periphery of the joining portion is reduced more. For such a reason, in order to improve the durability of the cylinder more, the groove is preferably formed close to the joining portion.

However, in the cylinder disclosed in WO2014/184291A2, in order to form the groove of the inner peripheral surface of the cylinder close to the joining portion, there is a need for making the positioning portion of the cylinder bottom short. When the positioning portion is short, the cylinder tube and the cylinder bottom cannot be positioned by the positioning portion, and there is a possibility that forming precision of the pressure resistant device is lowered.

An object of the present invention is to improve forming precision and durability of a pressure resistant device.

According to one aspect of the present invention, a pressure resistant device includes a tubular main body portion, a lid portion having an annular wall portion, the wall portion and the main body portion being joined to each other to close an opening of the main body portion, a positioning portion provided to oppose at least one of inner peripheral surfaces of the main body portion and the wall portion, the positioning portion being configured to determine relative positions of the main body portion and the lid portion, and a groove portion formed on the at least one of the inner peripheral surfaces of the main body portion and the wall portion, the groove portion extending in the circumferential direction, wherein the positioning portion is provided to oppose an edge of the groove portion.

DESCRIPTION OF EMBODIMENTS

Hereinafter, a pressure resistant device according to embodiments of the present invention will be described with reference to the drawings. The pressure resistant device is formed to be capable of storing a fluid, and receives pressure of the fluid from the inside. Hereinafter, a case where the pressure resistant device is a cylinder 100, 200, 300, 400, 500, or 600 to be used in a hydraulic cylinder 1 serving as a fluid pressure cylinder will be described.

First Embodiment

Figure 1:
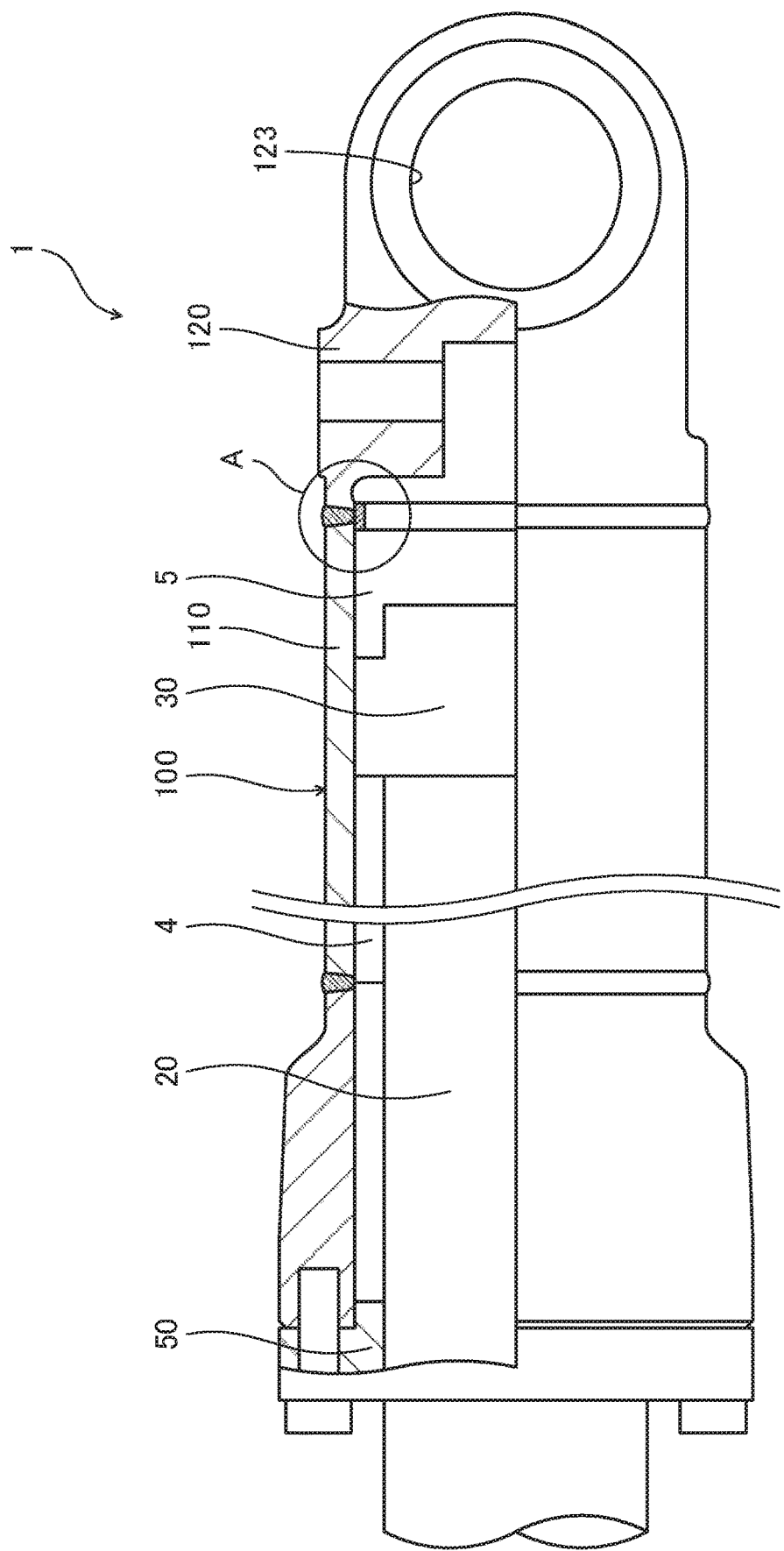
FIG. 1 is a sectional view of parts of a hydraulic cylinder including a cylinder according to a first embodiment of the present invention.

First of all, the cylinder 100 according to the first embodiment of the present invention and the hydraulic cylinder 1 will be described with reference to FIGS. 1 to 3. As shown in FIG. 1, the hydraulic cylinder 1 includes the hollow cylinder 100, a piston rod 20 inserted into the cylinder 100, and a piston 30 provided in an end portion of the piston rod 20 and configured to slide along an inner peripheral surface of the cylinder 100. The inside of the cylinder 100 is partitioned into a rod side chamber 4 and an anti-rod side chamber 5 by the piston 30. Working oils serving as working fluids are charged into the rod side chamber 4 and the anti-rod side chamber 5.

The piston rod 20 extends out from the cylinder 100, and the hydraulic cylinder 1 is extended and contracted by the working oils supplied to and discharged from the cylinder 100. Specifically, when the working oil is supplied to the anti-rod side chamber 5 and the working oil is discharged from the rod side chamber 4, the hydraulic cylinder 1 is extended. When the working oil is supplied to the rod side chamber 4 and the working oil is discharged from the anti-rod side chamber 5, the hydraulic cylinder 1 is contracted.

The cylinder 100 includes a cylinder tube (tubular main body portion) 110, and a cylinder bottom (lid portion) 120 configured to close one opening of the cylinder tube 110. The other opening of the cylinder tube 110 is closed by a cylinder head 50 configured to slidably support the piston rod 20. The cylinder bottom 120 is formed with an attachment portion 123 for attaching the hydraulic cylinder 1 to another device.

Hereinafter, the direction along the center axis of the cylinder tube 110 will be called the "axial direction", the direction of radiation on the center axis of the cylinder tube 110 will be called the "radial direction", and the direction along the circumference of the center axis of the cylinder tube 110 will be called the "circumferential direction".

Figure 2:
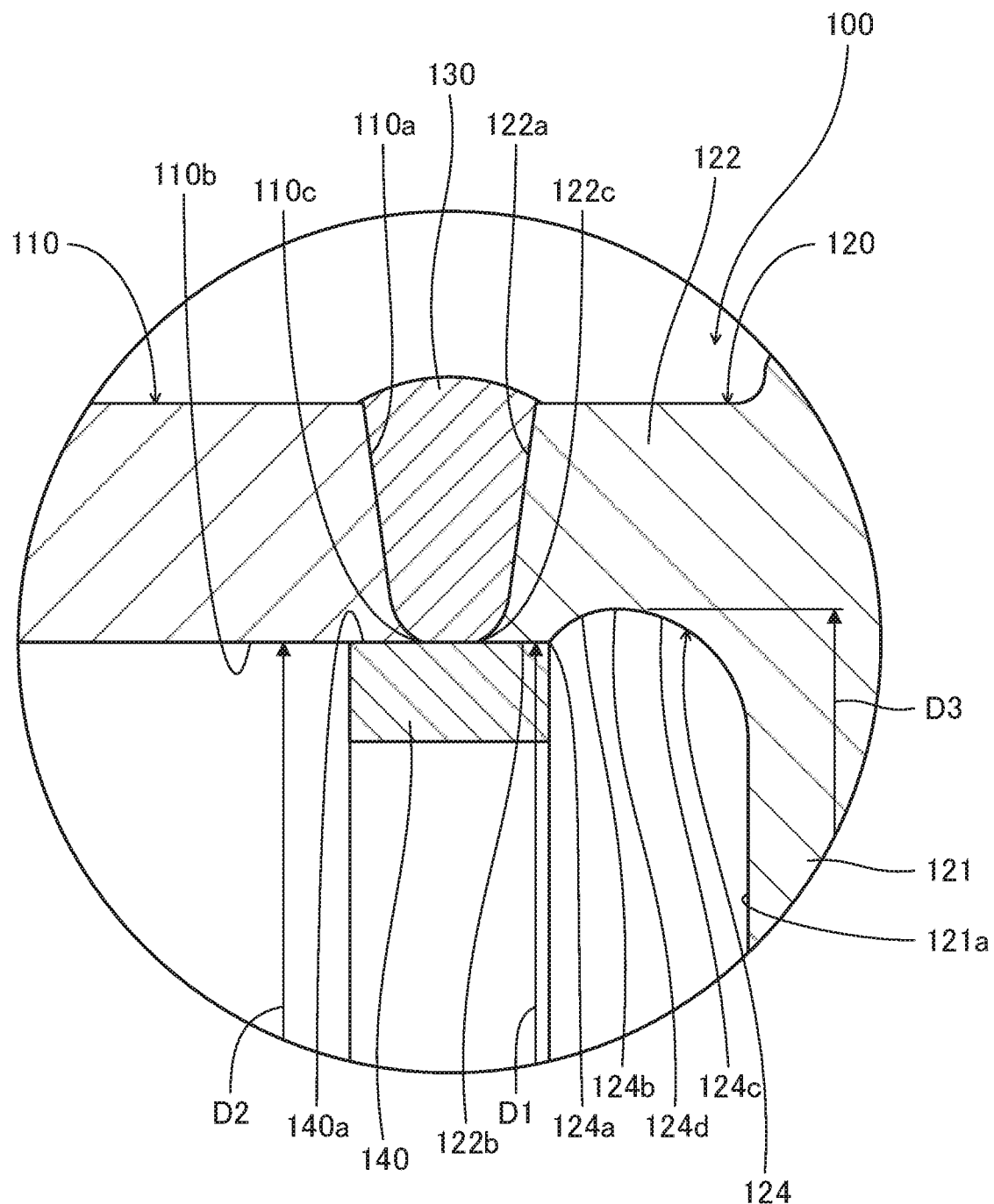
FIG. 2 is an enlarged view of an A portion in FIG. 1.

FIG. 2 is an enlarged view of an A portion in FIG. 1. As shown in FIG. 2, the cylinder bottom 120 has a bottom main body 121 configured to cover the opening of the cylinder tube 110, and an annular wall portion 122 extending in the axial direction from the bottom main body 121. A leading end portion 122a of the wall portion 122 is joined to an opening end portion 110a of the cylinder tube 110 by welding. In other words, the cylinder tube 110 and the cylinder bottom 120 are joined to each other via a joining portion 130 formed between the leading end portion 122a of the wall portion 122 and the opening end portion 110a of the cylinder tube 110. For this welding, an arbitrary method such as arc welding including plasma welding and TIG welding, gas welding, laser welding, electron beam welding, electric resistance welding, and friction welding can be used.

The cylinder 100 also includes a back ring 140 serving as a positioning portion configured to determine relative positions of the cylinder tube 110 and the cylinder bottom 120. The back ring 140 is provided to oppose an inner peripheral surface 110b of the cylinder tube 110 and an inner peripheral surface 122b of the wall portion 122.

The back ring 140 is formed separately from the cylinder tube 110 and the wall portion 122 in a state where the cylinder tube 110 and the wall portion 122 are not joined. At the time of joining of the cylinder tube 110 and the wall portion 122, the back ring 140 is fitted to both the cylinder tube 110 and the wall portion 122. Thereby, it is possible to prevent relative movement of the cylinder tube 110 and the cylinder bottom 120 at the time of joining. Thus, it is possible to join the cylinder tube 110 and the wall portion 122 to each other in a state where the axis of the cylinder tube and the axis of the wall portion match with each other.

The cylinder tube 110 and the wall portion 122 are welded to each other so that the joining portion 130 reaches the inner periphery of the cylinder tube 110 and the wall portion 122. Therefore, an outer peripheral surface 140a of the back ring 140 is joined to the joining portion 130. In the example shown in FIG. 2, only part of the outer peripheral surface 140a of the back ring 140 is joined to the joining portion 130. However, the entire outer peripheral surface 140a of the back ring 140 may be joined to the joining portion 130.

In the cylinder 100 in which the cylinder tube 110 and the cylinder bottom 120 are joined to each other, the joining portion 130 may project from the inner peripheral surface 110b of the cylinder tube 110 and the inner peripheral surface 122b of the wall portion 122. Even in a case where the back ring 140 is provided in the inner periphery of the joining portion 130, the joining portion 130 may slightly project toward the back ring 140. In such a case, roots 110c, 122c of projecting portions are formed in the joining portion 130. At the roots 110c, 122c, stress concentration easily occurs when the cylinder 100 receives a tensile load in the axial direction.

In the cylinder 100, in order to decrease the stress at the roots 110c, 122c, an annular groove portion 124 extending in the circumferential direction is formed on the inner peripheral surface 122b of the wall portion 122. Specifically, the groove portion 124 is formed to have an arch-shaped section so that a maximum inner diameter D3 of the groove portion 124 is larger than an inner diameter D1 of the leading end portion 122a of the wall portion 122 and an inner diameter D2 of the opening end portion 110a of the cylinder tube 110. Hereinafter, the maximum inner diameter D3 of the groove portion 124 will be simply called the "inner diameter D3 of the groove portion 124".

Figure 3:
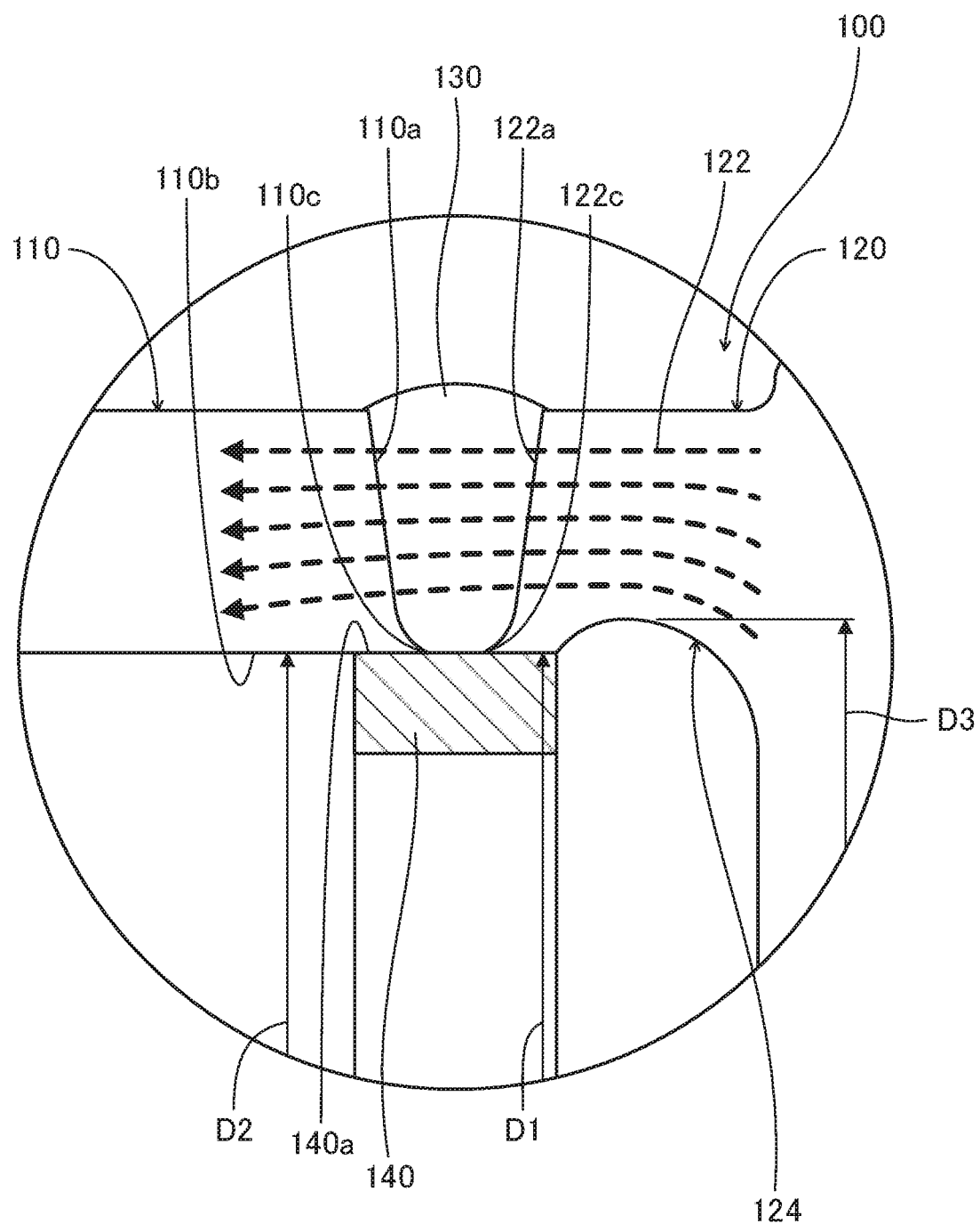
FIG. 3 is a view showing flows of force to be transmitted from a cylinder bottom to a cylinder tube when the cylinder receives a tensile load (field lines), corresponding to FIG. 2.

FIG. 3 is a view showing flows of force (field lines) to be transmitted from the cylinder bottom 120 to the cylinder tube 110 when the cylinder 100 receives a tensile load in the axial direction, corresponding to FIG. 2. In FIG. 3, the field lines are shown by broken lines, and oblique lines indicating sections of the cylinder tube 110, the cylinder bottom 120, and the joining portion 130 are omitted. The tensile load acts on the cylinder 100 for example by pressure of the working oils in the cylinder 100 and a load coupled to the hydraulic cylinder 1.

When the cylinder 100 receives the tensile load in the axial direction, force acting on the cylinder bottom 120 is transmitted to the cylinder tube 110 through the joining portion 130. At this time, a route of the force is narrowed down by the groove portion 124. Since the inner diameter D3 of the groove portion 124 is larger than the inner diameter D1 of the leading end portion 122a of the wall portion 122 and the inner diameter D2 of the opening end portion 110a of the cylinder tube 110, the force is transmitted to the cylinder tube 110 mainly via a radially outside region of the joining portion 130. Therefore, it is possible to reduce the force transmitted to the inner periphery of the joining portion 130, and it is possible to decrease the stress at the roots 110c, 122c of the joining portion 130. Thereby, it is possible to prevent breakage of the roots 110c, 122c, and it is possible to improve durability of the cylinder 100.

The groove portion 124 is preferably formed close to the joining portion 130. This is because the force acting on the cylinder bottom 120 passes through between the outer periphery and the groove portion 124 in the wall portion 122, then passes through the joining portion 130 while spreading radially inward, and is transmitted to the cylinder tube 110, and also because as the groove portion 124 is formed closer to the joining portion 130, the force to be transmitted to an inner peripheral surface of the joining portion 130 can be reduced more.

As shown in FIG. 2, in the cylinder 100, the back ring 140 is provided to oppose an edge 124a of the groove portion 124 on the joining portion 130 side. Specifically, a position of an edge of the outer peripheral surface 140a of the back ring 140 matches with a position of the edge 124a of the groove portion 124. Therefore, the groove portion 124 is formed in the wall portion 122 without having any space from the back ring 140 in the axial direction. Thus, it is possible to extend length of the back ring 140 in the axial direction while bringing the groove portion 124 close to the joining portion 130, and it is possible to decrease the stress in the inner periphery of the joining portion 130 while maintaining positioning precision of the cylinder tube 110 and the cylinder bottom 120. Thereby, it is possible to form the cylinder 100 with high precision and improve durability.

The position of the edge of the outer peripheral surface 140a of the back ring 140 matches with the position of the edge 124a of the groove portion 124. Thus, the entire outer peripheral surface 140a of the back ring 140 opposes the inner peripheral surface 110b of the cylinder tube 110 and the inner peripheral surface 122b of the wall portion 122. Therefore, it is possible to join the cylinder tube 110 and the wall portion 122 in a state where the axis of the cylinder tube and the axis of the wall portion match with each other with higher precision.

The groove portion 124 have an inside surface formed with first and second curved surface portions 124b, 124c having different curvature radiuses from each other. Specifically, the first curved surface portion 124b is formed in a curved surface from a bottom portion 124d of the groove portion 124 toward the edge 124a, and the second curved surface portion 124c is formed in a curved surface from the bottom portion 124d toward the opposite side of the edge 124a.

The curvature radius of the first curved surface portion 124b is smaller than the curvature radius of the second curved surface portion 124c. Therefore, a gap between the edge 124a and the bottom portion 124d of the groove portion 124 is smaller than a case where the curvature radius of the first curved surface portion 124b is not smaller than the curvature radius of the second curved surface portion 124c. Thus, it is possible to form the bottom portion 124d close to the joining portion 130 without bringing the edge 124a close to the joining portion 130, and it is possible to decrease the stress in the inner periphery of the joining portion 130 more while maintaining the positioning precision of the cylinder tube 110 and the cylinder bottom 120. Thereby, it is possible to form the cylinder 100 with high precision and improve the durability more.

In the cylinder 100, the back ring 140 is formed separately from the cylinder tube 110 and the cylinder bottom 120, and provided to oppose the inner peripheral surface 110b of the cylinder tube 110 and the inner peripheral surface 122b of the wall portion 122. Therefore, it is possible to decrease heat transfer from the cylinder tube 110 and the cylinder bottom 120 to the back ring 140 at the time of welding. Thus, it is possible to prevent softening of the back ring 140 according to a temperature increase, and it is possible to decrease projection of the joining portion 130. Thereby, it is possible to ease stress concentration in the joining portion 130 and improve the durability of the cylinder 100 more.

The groove portion 124 is formed on the inner peripheral surface 122b of the wall portion 122. Thus, rigidity of the wall portion 122 is lower than a case where no groove portion 124 is formed. Therefore, when the cylinder tube 110 is deformed by the tensile load or pressure of the working oils in the cylinder 100, the wall portion 122 can be deformed in accordance with deformation of the cylinder tube 110. Thus, it is possible to ease stress concentration occurring at the roots 110c, 122c of the joining portion 130.

When the cylinder tube 110 is deformed by the pressure of the working oils in the cylinder 100, a base of the wall portion 122 on the bottom main body 121 side becomes a supporting point of flexure. The groove portion 124 is formed in a corner portion between the wall portion 122 and the bottom main body 121, and rigidity of the base of the wall portion 122 is small. Therefore, it is possible to more easily deform the wall portion 122 in accordance with the deformation of the cylinder tube 110. Thus, it is possible to more ease the stress concentration occurring at the roots 110c, 122c of the joining portion 130.

The groove portion 124 is formed over the inner peripheral surface 122b of the wall portion 122 and an end surface 121a of the bottom main body 121. That is, the inside surface of the groove portion 124 and the end surface 121a of the bottom main body 121 continue to each other without having any angular portion in between. Therefore, it is possible to increase the curvature radius of the groove portion 124 and it is possible to ease stress concentration in the groove portion 124.

According to the first embodiment described above, the following effects will be exerted.

In the cylinder 100, the back ring 140 opposes the edge 124a of the groove portion 124. Thus, it is possible to extend the length of the back ring 140 while bringing the groove portion 124 close to the joining portion 130. Therefore, it is possible to position the cylinder tube 110 and the cylinder bottom 120 with high precision at the time of joining, and it is possible to decrease the stress concentration in the inner periphery of the joining portion 130 after joining. Thereby, it is possible to form the cylinder 100 with high precision and improve the durability of the cylinder 100.

In the cylinder 100, the entire outer peripheral surface 140a of the back ring 140 opposes the inner peripheral surface 110b of the cylinder tube 110 and the inner peripheral surface 122b of the wall portion 122. Therefore, it is possible to match the axis of the cylinder tube 110 and the axis of the wall portion 122 with each other with higher precision at the time of joining.

In the cylinder 100, the back ring 140 is formed separately from the cylinder tube 110 and the cylinder bottom 120, and provided to oppose the inner peripheral surface 110b of the cylinder tube 110 and the inner peripheral surface 122b of the wall portion 122. Therefore, it is possible to prevent the softening of the back ring 140 at the time of welding, and it is possible to decrease the projection of the joining portion 130. Thereby, it is possible to ease the stress concentration in the joining portion 130 and improve the durability of the cylinder 100 more.

The curvature radius of the first curved surface portion 124b is smaller than the curvature radius of the second curved surface portion 124c. Thus, it is possible to form the bottom portion 124d close to the joining portion 130 without bringing the edge 124a close to the joining portion 130. Therefore, it is possible to decrease the stress in the inner periphery of the joining portion 130 more, and it is possible to form the cylinder 100 with higher precision and improve the durability more.

Second Embodiment

Figure 4:
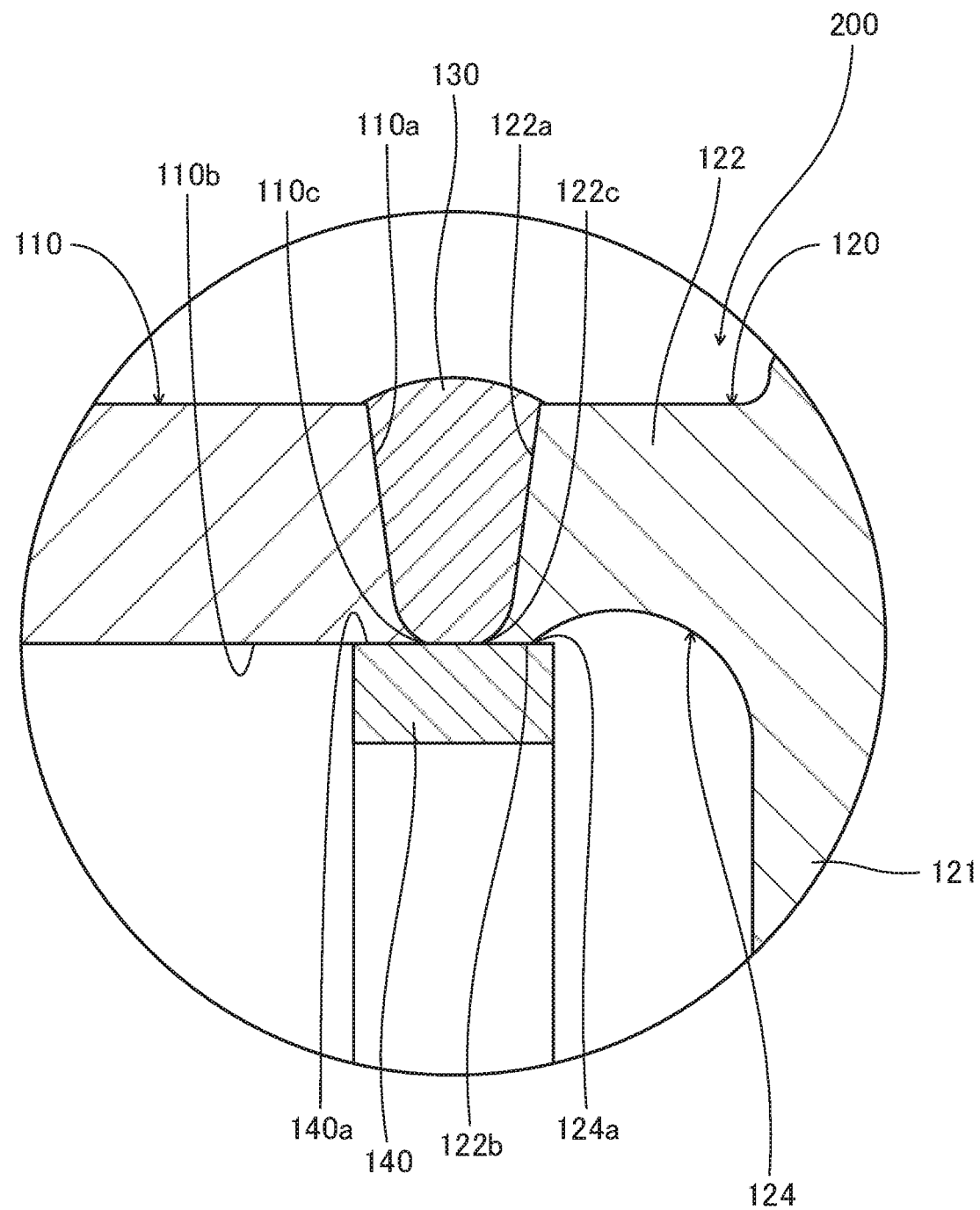
FIG. 4 is an enlarged sectional view of a cylinder according to a second embodiment of the present invention.

Next, the cylinder 200 according to the second embodiment of the present invention will be described with reference to FIG. 4. The same configurations as the cylinder 100 according to the first embodiment will be given the same reference signs, and will not be described. A hydraulic cylinder to which the cylinder 200 can be applied is substantially the same as the hydraulic cylinder 1 shown in FIG. 1. Thus, the hydraulic cylinder is not shown in the figure.

In the cylinder 200, a back ring 140 overlaps with an edge 124a of a groove portion 124. Specifically, the back ring 140 exceeds the edge 124a of the groove portion 124 and extends to the opposite side of a joining portion 130.

In the cylinder 200, as well as the cylinder 100, the groove portion 124 is formed in a wall portion 122 without having any space from the back ring 140 in the axial direction. Therefore, it is possible to form the cylinder 200 with high precision and improve the durability.

Although not shown, first and second curved surface portions having different curvature radiuses from each other may be formed on an inside surface of the groove portion 124 as well as the groove portion 124 of the cylinder 100.

Third Embodiment

Figure 5:
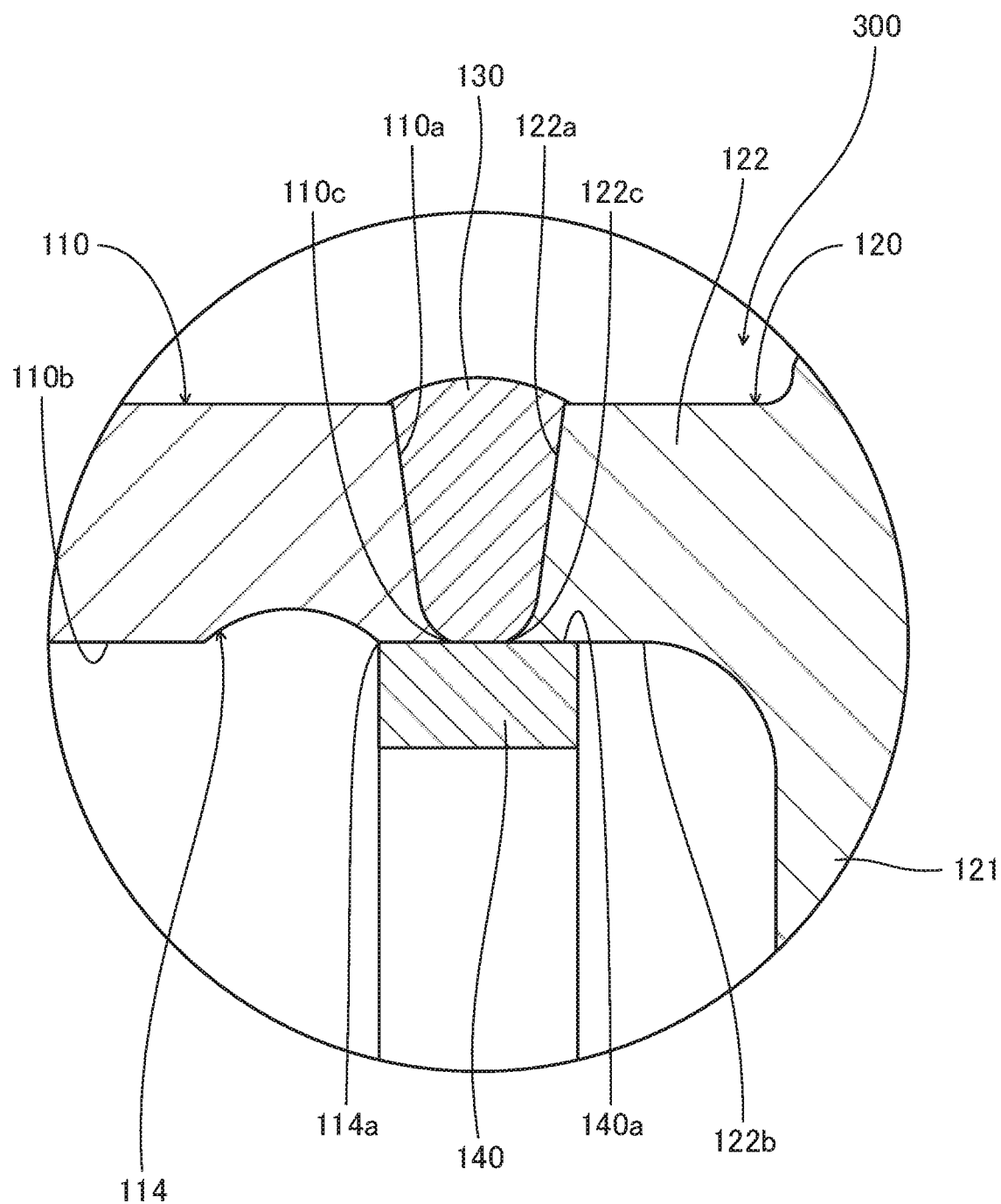
FIG. 5 is an enlarged sectional view of a cylinder according to a third embodiment of the present invention.

Next, the cylinder 300 according to the third embodiment of the present invention will be described with reference to FIG. 5. The same configurations as the cylinder 100 according to the first embodiment will be given the same reference signs and will not be described. A hydraulic cylinder to which the cylinder 300 is applicable is substantially the same as the hydraulic cylinder 1 shown in FIG. 1. Thus, the hydraulic cylinder is not shown in the figure.

In the cylinder 300, in place of the groove portion 124 (see FIG. 2) of the cylinder 100 according to the first embodiment, a groove portion 114 is formed on an inner peripheral surface 110*b* of a cylinder tube 110. A back ring 140 is provided to oppose an edge 114*a* of the groove portion 114 on the joining portion 130 side. Specifically, a position of an edge of an outer peripheral surface 140*a* of the back ring 140 matches with a position of the edge 114*a* of the groove portion 114.

In the cylinder 300, the groove portion 114 is also formed in the cylinder tube 110 without having any space from the back ring 140 in the axial direction. Therefore, it is possible to form the cylinder 300 with high precision and improve the durability.

Although not shown, the back ring 140 may overlap with the edge 114*a* of the groove portion 114. As well as the groove portion 124 (see FIG. 2) of the cylinder 100, first and second curved surface portions having different curvature radiuses from each other may be formed on an inside surface of the groove portion 114. In addition, a groove portion 124 (see FIG. 2) or a groove portion 124 (see FIG. 4) may be formed on an inner peripheral surface 122*b* of a wall portion 122.

Fourth Embodiment

Figure 6:
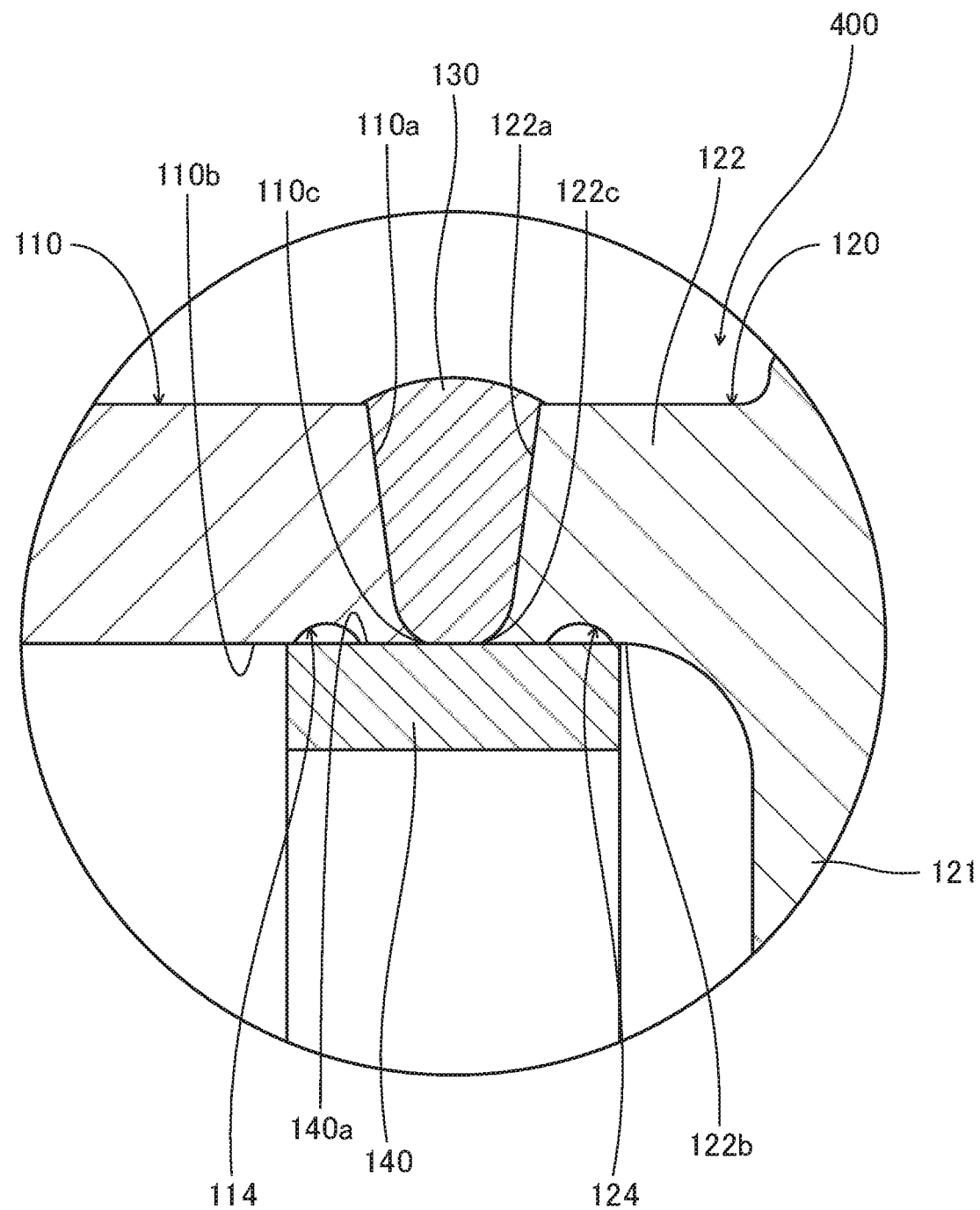
FIG. 6 is an enlarged sectional view of a cylinder according to a fourth embodiment of the present invention.

Next, the cylinder 400 according to the fourth embodiment of the present invention will be described with reference to FIG. 6. The same configurations as the cylinders 100, 300 according to the first and third embodiments will be given the same reference signs and will not be described. A hydraulic cylinder to which the cylinder 400 is applicable is substantially the same as the hydraulic cylinder 1 shown in FIG. 1. Thus, the hydraulic cylinder is not shown in the figure.

In the cylinder 400, in place of the groove portions 124, 114 (see FIGS. 2 and 5) of the cylinders 100, 300 according to the first and third embodiments, groove portions 114, 124 are respectively formed on an inner peripheral surface 110*b* of a cylinder tube 110 and on an inner peripheral surface 122*b* of a wall portion 122 of a cylinder bottom 120. A back ring 140 is provided to cover the groove portions 114, 124.

In the cylinder 400, the groove portions 114, 124 are also formed in the cylinder tube 110 and in the wall portion 122 of the cylinder bottom 120 without having any space from the back ring 140 in the axial direction. Therefore, it is possible to form the cylinder 400 with high precision and improve the durability.

The back ring 140 is provided to cover the groove portions 114, 124. Therefore, the back ring 140 also opposes a region of the inner peripheral surface 110*b* on the opposite side of a joining portion 130 with respect to the groove portion 114. Similarly, the back ring 140 also opposes a region of the inner peripheral surface 122*b* on the opposite side of the joining portion 130 with respect to the groove portion 124. Therefore, it is possible to position the cylinder tube 110 and the cylinder bottom 120 over a wider range of an outer peripheral surface 140*a* of the back ring 140. Thus, it is possible to join the cylinder tube 110 and the wall portion 122 in a state where the axis of the cylinder tube and the axis of the wall portion match with each other with higher precision.

Although the groove portions 114, 124 are formed in the cylinder 400, only the groove portion 114 or the groove portion 124 may be formed. As well as the groove portion 124 (see FIG. 2) of the cylinder 100, first and second curved surface portions having different curvature radiuses from each other may be formed on inside surfaces of the groove portions 114, 124.

Fifth Embodiment

Figure 7:
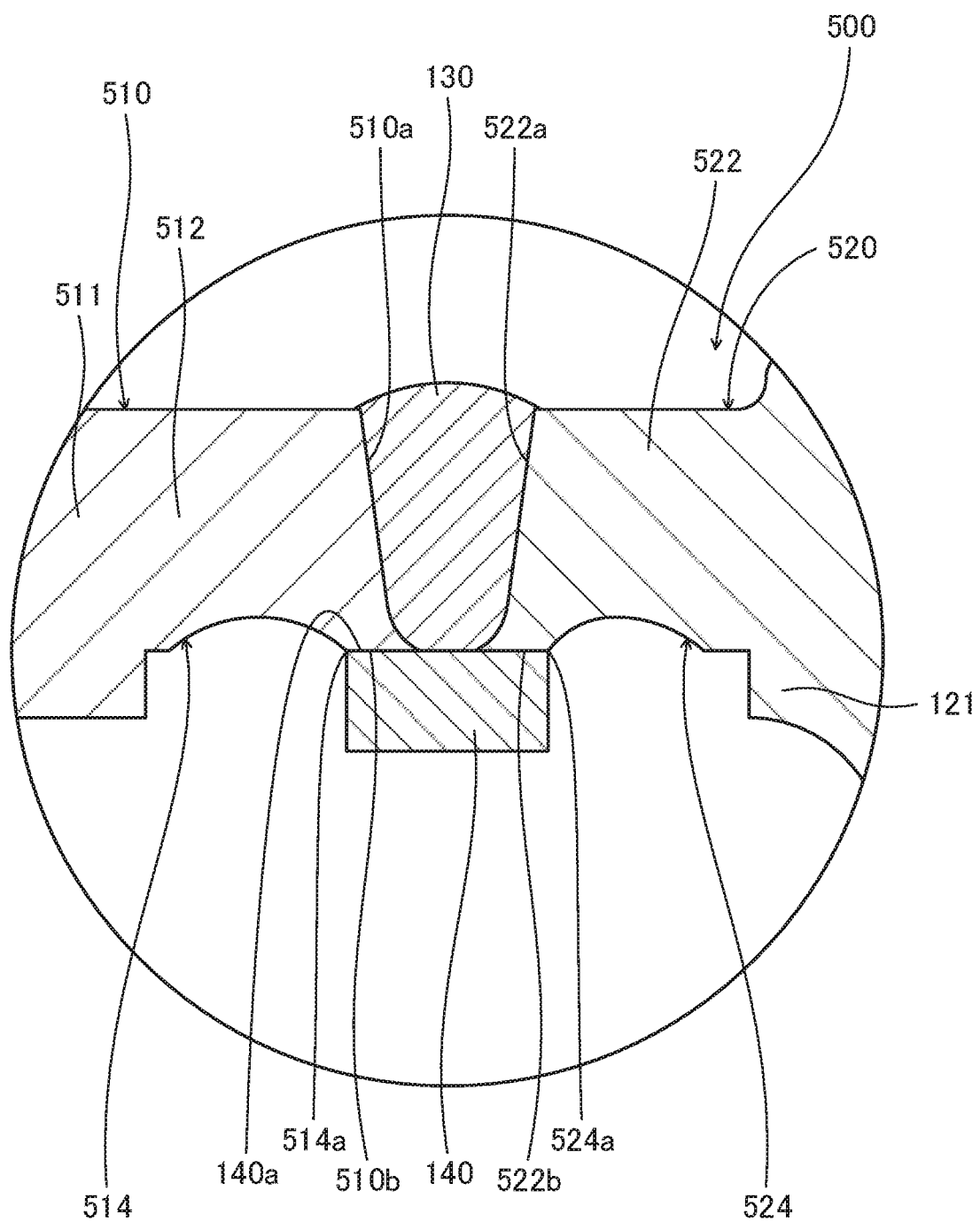
FIG. 7 is an enlarged sectional view of a cylinder according to a fifth embodiment of the present invention.

Next, the cylinder 500 according to the fifth embodiment of the present invention will be described with reference to FIG. 7. The same configurations as the cylinders 100, 300 according to the first and third embodiments will be given the same reference signs and will not be described. A hydraulic cylinder to which the cylinder 500 is applicable is substantially the same as the hydraulic cylinder 1 shown in FIG. 1. Thus, the hydraulic cylinder is not shown in the figure.

In the cylinder 500, a cylinder tube 510 has a tube main body 511 that houses a piston 30 (see FIG. 1), and an annular portion 512 extending in an annular form in the axial direction from one end of the tube main body 511. An inner diameter of the tube main body 511 corresponds to a so-called cylinder diameter, and an inner diameter of the annular portion 512 is larger than the inner diameter of the tube main body 511.

A leading end portion of the annular portion 512 is an opening end portion 510*a* of the cylinder tube 510, and an opening of the cylinder tube 510 is formed by the leading end portion of the annular portion 512. That is, the annular portion 512 is joined to a wall portion 522 of a cylinder bottom 520 by welding. In other words, the cylinder tube 510 and the cylinder bottom 520 are joined to each other via a joining portion 130 formed between a leading end portion 522*a* of the wall portion 522 and the opening end portion 510*a* of the cylinder tube 510. For this welding, an arbitrary method such as arc welding including plasma welding and TIG welding, gas welding, laser welding, electron beam welding, electric resistance welding, and friction welding can be used.

A back ring 140 is provided to oppose an inner peripheral surface 510*b* of the annular portion 512 of the cylinder tube 510 and an inner peripheral surface 522*b* of the wall portion 522. Therefore, it is possible to join the annular portion 512 of the cylinder tube 510 and the wall portion 522 of the cylinder bottom 520 in a state where the axis of the annular portion and the axis of the wall portion match with each other.

An annular groove portion 514 extending in the circumferential direction is formed on the inner peripheral surface 510*b* of the annular portion 512, and an annular groove portion 524 extending in the circumferential direction is formed on the inner peripheral surface 522*b* of the wall portion 522. Positions of an edge of an outer peripheral surface 140*a* of the back ring 140 match with positions of edges 514*a*, 524*a* of the groove portions 514, 524 on the joining portion 130 side. Therefore, it is possible to form the cylinder 500 with high precision and improve the durability.

Although not shown, the back ring 140 may be provided to overlap with the edges 514*a*, 524*a* of the groove portions 514, 524. The back ring 140 may be provided to cover the groove portions 514, 524. Further, as well as the groove portion 124 (see FIG. 2) of the cylinder 100, first and second curved surface portions having different curvature radiuses from each other may be formed on inside surfaces of the groove portions 514, 524.

The cylinder 500 is not limited to the mode in which the groove portion 514 and the groove portion 524 are formed both on the inner peripheral surface 510*b* of the annular portion 512 and on the inner peripheral surface 522b of the wall portion 522. The groove portion 514 may be formed only on the inner peripheral surface 510b of the annular portion 512 and no groove portion 524 may be formed on the inner peripheral surface 522b of the wall portion 522. Alternatively, the groove portion 524 may be formed only on the inner peripheral surface 522b of the wall portion 522 and no groove portion 514 may be formed on the inner peripheral surface 510b of the annular portion 512.

Sixth Embodiment

Figure 8:
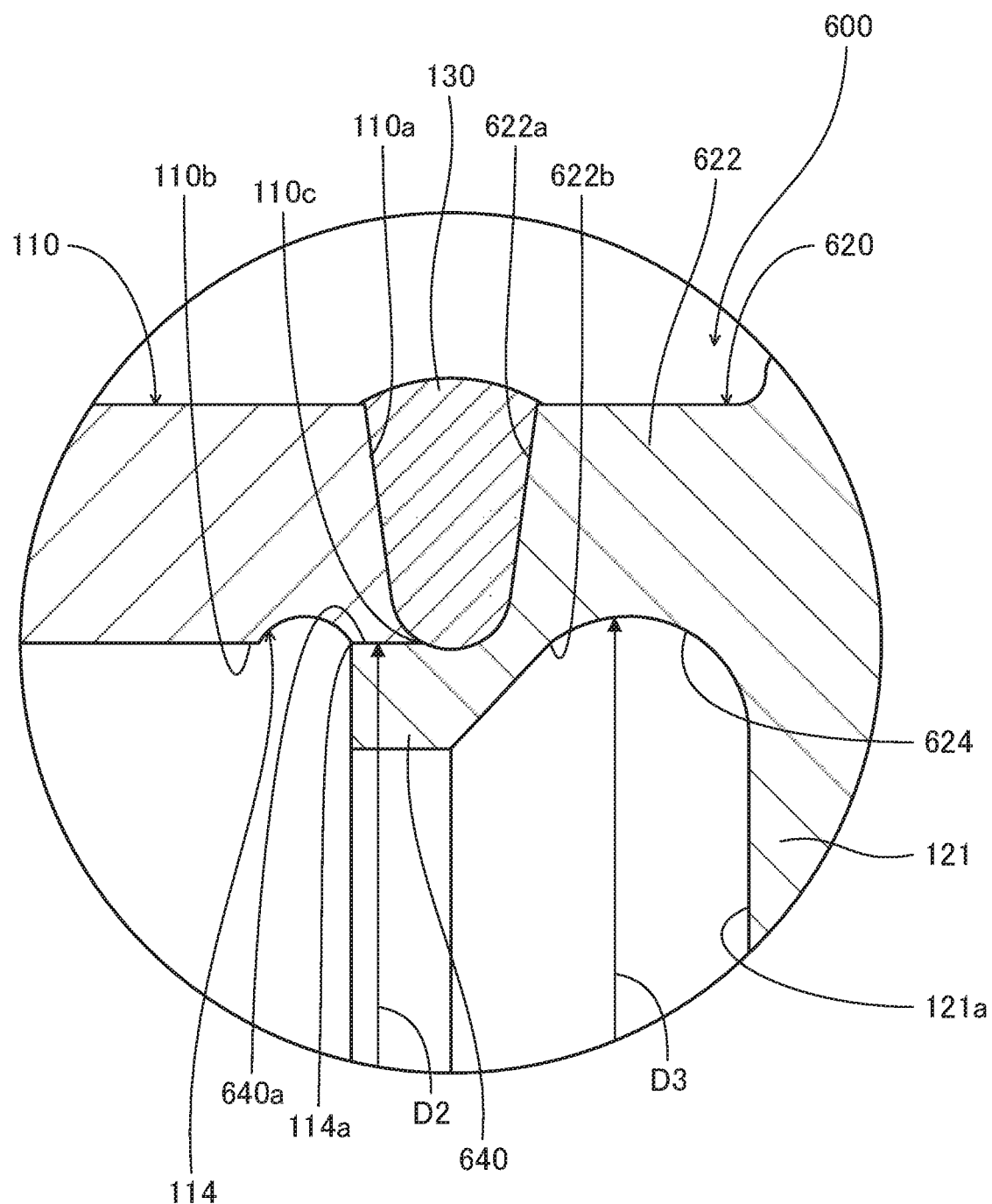
FIG. 8 is an enlarged sectional view of a cylinder according to a sixth embodiment of the present invention.

Next, the cylinder 600 according to the sixth embodiment of the present invention will be described with reference to FIG. 8. The same configurations as the cylinder 100 according to the first embodiment will be given the same reference signs and will not be described. A hydraulic cylinder to which the cylinder 600 is applicable is substantially the same as the hydraulic cylinder 1 shown in FIG. 1. Thus, the hydraulic cylinder is not shown in the figure.

In place of the back ring 140 (see FIG. 2) of the cinder 100 according to the first embodiment, the cylinder 600 includes a back portion 640 serving as a positioning portion integrated with a wall portion 622 of a cylinder bottom 620.

The back portion 640 is formed separately from a cylinder tube 110 in a state where the cylinder tube 110 and the wall portion 622 are not joined. At the time of joining the cylinder tube 110 and the wall portion 622, the back portion 640 is fitted to the cylinder tube 110. Thereby, it is possible to prevent relative movement of the cylinder tube 110 and the cylinder bottom 620 at the time of joining. Thus, it is possible to join the cylinder tube 110 and the wall portion 622 to each other in a state where the axis of the cylinder tube and the axis of the wall portion match with each other.

Since the back portion 640 and the wall portion 622 are integrated with each other, at the time of fitting the back portion 640 to the cylinder tube 110, it is possible to prevent the back portion 640 from moving with respect to the wall portion 622. Therefore, it is possible to easily join the cylinder tube 110 and the wall portion 622 and easily manufacture the cylinder 600.

A joining portion 130 reaches the inner periphery of the cylinder tube 110. Therefore, an outer peripheral surface 640a of the back portion 640 is joined to the joining portion 130. In the example shown in FIG. 8, only part of the outer peripheral surface 640a of the back portion 640 is joined to the joining portion 130. However, the entire outer peripheral surface 640a of the back portion 640 may be joined to the joining portion 130.

An annular groove portion 114 extending in the circumferential direction is formed on an inner peripheral surface 110b of the cylinder tube 110. A position of an edge of the outer peripheral surface 640a of the back portion 640 matches with a position of an edge 114a of the groove portion 114 on the joining portion 130 side. Therefore, the groove portion 114 is formed in the cylinder tube 110 without having any space from the back portion 640 in the axial direction. Thus, without shortening size of the back portion 640 in the axial direction, it is possible to form the groove portion 114 close to the joining portion 130. Thereby, it is possible to form the cylinder 600 with high precision and improve the durability.

An annular groove portion 624 is formed on an inner peripheral surface 622b of the wall portion 622. An inner diameter D3 of the groove portion 624 is larger than an inner diameter D2 of an opening end portion 110a of the cylinder tube 110. Therefore, it is also possible to reduce force transmitted to the inner periphery of the joining portion 130 by the groove portion 624, and it is possible to decrease stress at a root 110c of the joining portion 130. Thereby, it is possible to prevent breakage of the root 110c and improve the durability of the cylinder 600.

Although not shown, the back portion 640 may be provided to overlap with the edge 114a of the groove portion 114. The back portion 640 may be provided to cover the groove portion 114. Further, as well as the groove portion 124 (see FIG. 2) of the cylinder 100, first and second curved surface portions having different curvature radiuses from each other may be formed on an inside surface of the groove portion 114.

The back portion 640 may be integrated with the cylinder tube 110 in place of the wall portion 622. In this case, an opening of the cylinder tube 110 is closed by the cylinder bottom 120 shown in FIG. 2 in place of the cylinder bottom 620, and the position of the edge 124a of the groove portion 124 matches with a position of an edge of the outer peripheral surface 640a of the back portion 640 integrated with the cylinder tube 110.

Hereinafter, the configurations, actions, and effects of the embodiments of the present invention will be described collectively.

The cylinder 100, 200, 300, 400, 500, or 600 includes the cylinder tube 110 or 510, the cylinder bottom 120, 520, or 620 having the annular wall portion 122, 522, or 622, the wall portion 122, 522, or 622 and the cylinder tube 110 or 510 being joined to each other to close the opening of the cylinder tube 110 or 510, the back ring 140 or the back portion 640 provided to oppose the inner peripheral surfaces 110b, 122b, 510b, 522b, 622b of the cylinder tube 110 or 510 and the wall portion 122, 522, or 622, the back ring or the back portion being adapted to set relative positions of the cylinder tube 110 or 510 and the cylinder bottom 120, 520, or 620, and the groove portion 114, 124, 514, or 524 formed on the inner peripheral surface 110b, 122b, 510b, 522b, or 622b, the groove portion extending in the circumferential direction. The back ring 140 or the back portion 640 is provided to oppose the edge 114a, 124a, 514a, or 524a of the groove portion 114, 124, 514, or 524.

With this configuration, it is possible to extend the length of the back ring 140 or the back portion 640 while bringing the groove portion 114, 124, 514, or 524 close to the joining portion 130 between the wall portion 122, 522, or 622 and the cylinder tube 110 or 510. Therefore, it is possible to position the cylinder tube 110 or 510 and the cylinder bottom 120, 520, or 620 with high precision at the time of joining, and it is possible to decrease the stress in the inner periphery of the joining portion 130 after joining. Thereby, it is possible to improve forming precision and the durability of the cylinder 100, 200, 300, 400, 500, or 600.

In the cylinder 100, 200, 300, 400, or 500, the back ring 140 is formed separately from the cylinder tube 110 or 510 and the cylinder bottom 120 or 520, and provided to oppose the inner peripheral surfaces 110b, 122b, 510b, 522b of both the cylinder tube 110 or 510 and the wall portion 122 or 522.

With this configuration, the heat transfer from the cylinder tube 110 or 510 and the cylinder bottom 120 or 520 to the back ring 140 is decreased. Therefore, it is possible to prevent the softening of the back ring 140 at the time of joining, and it is possible to decrease the projection of the joining portion 130 between the wall portion 122 or 522 and the cylinder tube 110 or 510. Thereby, it is possible to ease the stress concentration in the joining portion 130 and improve the durability of the cylinder 100, 200, 300, 400, or 500.

In the cylinder 100, 300, 500, or 600, the back ring 140 or the back portion 640 is provided so that the position of the edge of the back ring or the back portion matches with the position of the edge of the groove portion 114, 124, 514, or 524.

With this configuration, the entire outer peripheral surface 140a or 640a of the back ring 140 or the back portion 640 opposes the inner peripheral surfaces 110b, 510b, 122b, 522b of the cylinder tube 110 or 510 and the wall portion 122 or 522. Therefore, it is possible to join the cylinder tube 110 or 510 and the wall portion 122 or 522 in a state where the axis of the cylinder tube and the axis of the wall portion match with each other with higher precision.

In the cylinder 400, the back ring 140 is provided to cover the groove portion 114 or 124.

With this configuration, the back ring 140 also opposes the region of the inner peripheral surface 110b or 122b on the opposite side of the joining portion 130 with respect to the groove portion 114 or 124. Therefore, it is possible to improve the positioning precision of the cylinder tube 110 and the cylinder bottom 120 more.

In the cylinder 100, the inside surface of the groove portion 124 has the first curved surface portion 124b formed in a curved surface from the bottom portion 124d of the groove portion 124 toward the joining portion 130, and the second curved surface portion 124c formed in a curved surface from the bottom portion 124d of the groove portion 124 toward the opposite side of the joining portion 130, and the curvature radius of the first curved surface portion 124b is smaller than the curvature radius of the second curved surface portion 124c.

With this configuration, it is possible to bring the bottom portion 124d of the groove portion 124 close to the joining portion 130 without bringing the edge 124a of the groove portion 124 close to the joining portion 130. Therefore, it is possible to decrease the stress in the inner periphery of the joining portion 130 more, and it is possible to improve the durability of the cylinder 100 more.

The present embodiments relate to the hydraulic cylinder 1 adapted to be extended and contracted by supplying and discharging the working oils to and from the cylinder. The cylinder is the cylinder 100, 200, 300, 400, 500, or 600.

With this configuration, the cylinder is the cylinder 100, 200, 300, 400, 500, or 600 described above. Thus, the cylinder has high durability. Therefore, it is possible to improve durability of the hydraulic cylinder 1.

Although the embodiment of the present invention has been described above, the above embodiment is merely an illustration of one exemplary application of the present invention and is not intended to limit the technical scope of the present invention to the specific configuration of the above embodiment.

(1) In the present embodiments, the groove portion 114, 124, 514, 524, or 624 is formed on the entire circumference in the circumferential direction. However, the groove portion 114, 124, 514, 524, or 624 may be formed in a portion in the circumferential direction.

(2) The section of the groove portion 114, 124, 514, 524, or 624 may be a shape other than an arch shape, for example, a triangular shape, a square shape, etc. The section of the groove portion 114, 124, 514, 524, or 624 is preferably formed in an arch shape, and in this case, it is possible to ease the stress concentration in the groove portion 114, 124, 514, 524, or 624.

(3) In the above embodiments, the cylinder used in the hydraulic cylinder 1 is described as the pressure resistant device. The pressure resistant device is not limited to this but may be a pressure container such as a tank for keeping a liquid or a gas.

The present application claims a priority based on Japanese Patent Application No. 2017-194856 filed with the Japan Patent Office on Oct. 5, 2017, and all the contents of this application are incorporated herein by reference.

The invention claimed is:

1. A pressure resistant device, comprising:
   a tubular main body portion having an opening;
   a lid portion having an annular wall portion joined to an end portion of the main body portion via a joining portion in an axial direction of the main body portion, to thereby close the opening of the main body portion;
   a positioning portion, housed in the main body portion or in both the main body portion and the wall portion, the positioning portion being configured to determine relative positions of the main body portion and the lid portion in a radial direction of the main body portion; and
   a groove portion formed on an inner peripheral surface of the main body portion or the wall portion, the groove portion extending in a circumferential direction of the main body portion, wherein
   the positioning portion abuts on an edge of the groove portion or overlaps the groove portion in the axial direction of the main body portion, and
   the groove portion is apart from the joining portion.

2. The pressure resistant device according to claim 1, wherein the positioning portion is formed separately from the main body portion and the lid portion, and faces the inner peripheral surfaces of both the main body portion and the wall portion.

3. The pressure resistant device according to claim 1, wherein an edge of the positioning portion in the axial direction of the main body portion is directly adjacent to the edge of the groove portion.

4. The pressure resistant device according to claim 1, wherein the positioning portion is provided to cover the groove portion.

5. A fluid pressure cylinder that is extended and contracted by supplying and discharging a working fluid to and from a cylinder, wherein the cylinder comprises the pressure resistant device according to claim 1.

6. The pressure resistant device according to claim 1, wherein the positioning portion is joined to the joining portion in the radial direction of the main body portion.

7. A pressure resistant device, comprising:
   a tubular main body portion having an opening;
   a lid portion having an annular wall portion joined to an end portion of the main body portion in an axial direction of the main body portion, to thereby close the opening of the main body portion;
   a positioning portion, housed in the main body portion or in both the main body portion and the wall portion, the positioning portion being configured to determine relative positions of the main body portion and the lid portion in a radial direction of the main body portion; and
   a groove portion formed on an inner peripheral surface of the main body portion or the wall portion, the groove portion extending in a circumferential direction of the main body portion, wherein
   the positioning portion abuts on an edge of the groove portion or overlaps the groove portion in the axial direction of the main body portion, an inside surface of the groove portion has a first curved surface portion formed in a curved surface from a bottom portion of the groove portion toward a joining portion between the wall portion and the main body portion, and a second curved surface portion formed in a curved surface from the bottom portion of the groove portion toward the opposite side of the joining portion, and a curvature radius of the first curved surface portion is smaller than a curvature radius of the second curved surface portion.

8. A pressure resistant device, comprising:

a tubular main body portion having an opening;

a lid portion having an annular wall portion joined to an end portion of the main body portion in an axial direction of the main body portion, to thereby close the opening of the main body portion;

a positioning portion, housed in the main body portion or in both the main body portion and the wall portion, the positioning portion being configured to determine relative positions of the main body portion and the lid portion in a radial direction of the main body portion; and a groove portion formed on an inner peripheral surface of the main body portion or the wall portion, the groove portion extending in a circumferential direction of the main body portion, wherein the positioning portion abuts on an edge of the groove portion or overlaps the groove portion in the axial direction of the main body portion, the positioning portion having a width, in the axial direction of the main body portion, greater than a width of the groove portion, and the positioning portion is disposed to entirely cover the groove portion in the axial direction of the main body portion without overlapping the groove portion in the radial direction of the main body portion.

* * * * *